United States Patent [19]
Wood

[11] 3,930,977
[45] Jan. 6, 1976

[54] PROTECTION SYSTEM FOR EQUIPMENT AND METALLIC FITTINGS OF NON-METALLIC HULLS OF POWER BOATS

[75] Inventor: Ralph E. Wood, Lake Worth, Fla.

[73] Assignee: Dunwood Development Corporation, Lake Worth, Fla.

[22] Filed: Apr. 23, 1973

[21] Appl. No.: 353,507

Related U.S. Application Data

[63] Continuation-in-part of Ser. No. 324,665, Jan. 18, 1973.

[52] U.S. Cl.............. 204/196; 204/147; 114/.5 R; 114/221 R
[51] Int. Cl.²................. C23F 13/00; B63B 17/00
[58] Field of Search .......... 204/147, 196, 148, 197; 114/.5 R, 221 R, 222

[56] References Cited
UNITED STATES PATENTS

| | | | |
|---|---|---|---|
| 2,762,767 | 9/1956 | Mosher et al. | 204/147 |
| 2,878,173 | 3/1959 | Obermann | 204/196 |
| 2,890,157 | 6/1959 | Raetzsch | 204/196 |
| 3,223,604 | 12/1965 | Marsh et al. | 204/196 |
| 3,241,512 | 3/1966 | Green | 114/222 |
| 3,303,118 | 2/1967 | Anderson | 204/196 |
| 3,383,588 | 5/1968 | Stoll et al. | 324/66 |
| 3,636,409 | 1/1972 | Stephens et al. | 204/196 |
| 3,769,926 | 11/1973 | Race | 204/196 |

OTHER PUBLICATIONS

"Motor Boating and Sailing", Feb. 1972, pp. 77–92.

*Primary Examiner*—T. Tung
*Attorney, Agent, or Firm*—John H. Merchant

[57] ABSTRACT

A system for protecting the personnel and the electrical equipment of power boats having non-metallic hulls, and for the cathodic protection of the hulls of the metal fittings of such boats when docked and supplied from a shore-based alternating current supply, in which circuit breakers are inserted in the hot leg and the neutral leg of the shore-based alternating current supply, and including a polarity alarm and a polarity light socket in which is inserted a polarity light tester as described in U.S. Pat. No. 3,383,588, and in which the negative lead of the battery ground, the equipment ground, and the neutral leg of the shore-based alternating current supply are connected electrically with both the ground plate and the bonding ground of the boat.

3 Claims, 1 Drawing Figure

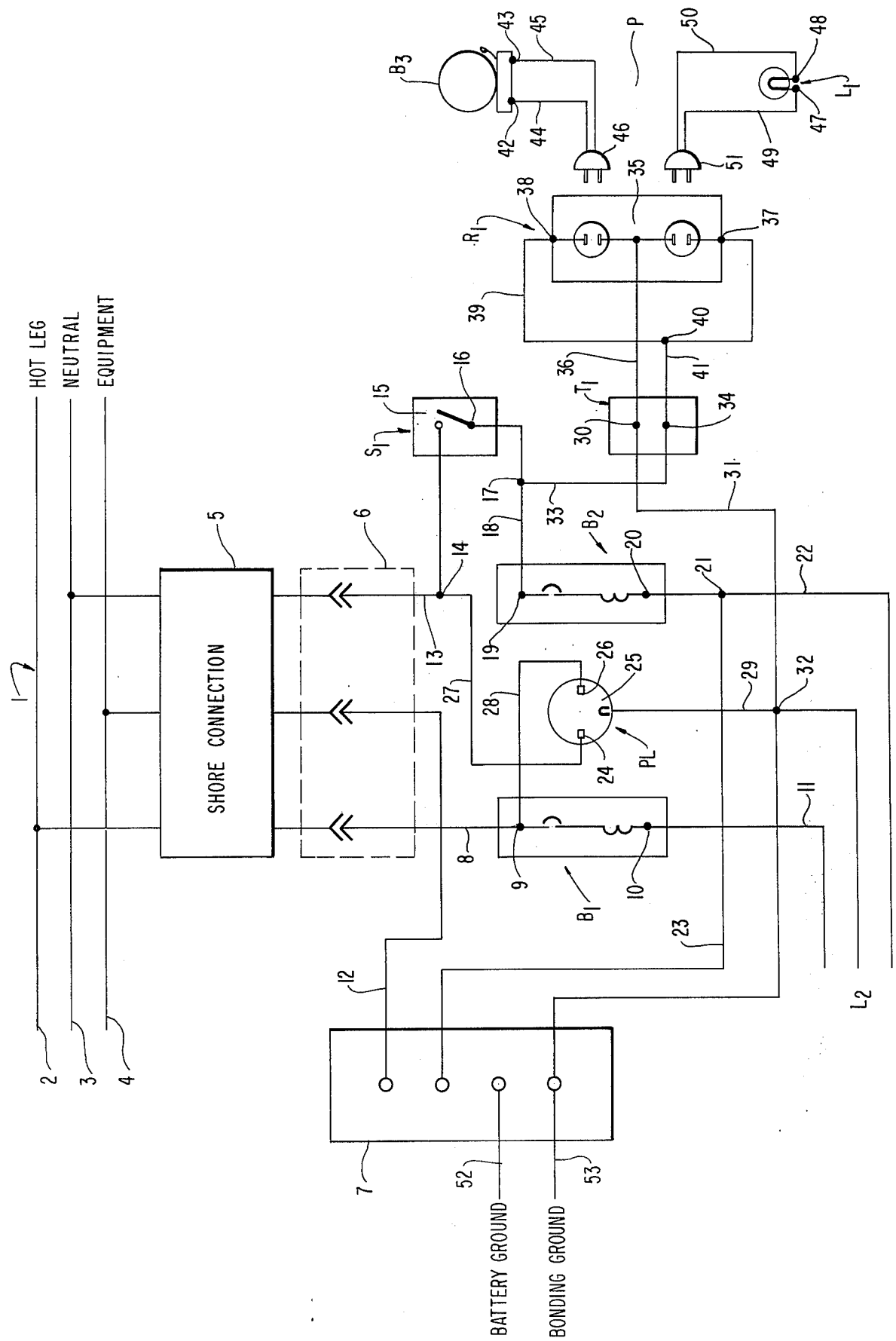

PROTECTION SYSTEM FOR EQUIPMENT AND METALLIC FITTINGS OF NON-METALLIC HULLS OF POWER BOATS

This invention relates to a system for the protection of personnel and the electrical equipment of power boats having non-metallic hulls, and for the cathodic protection for the hulls of such boats.

This application is a continuation-in-part of my prior application Ser. No. 324,665, filed Jan. 18, 1973, entitled Cathodic Protection System for the metallic fittings of Non-Metallic Hulls of Power Boats. The latter application describes a novel circuitry in which a battery charger is used to maintain all banks of storage batteries in operating condition, a flexible switching arrangement permitting the testing and charging of each bank of batteries, together or separately, and in which the negative leads of the battery charger; the banks of storage batteries; the equipment ground, and the neutral leg of a shore-based alternating current supply are electrically connected with both the ground plate and the bonding ground of the boat to lessen or eliminate electrolysis. Such a circuitry eliminates the direct current being generated by the lag and lead in the sine wave between the equipment ground and neutral as well as the rectifying effect of the earth and sea water on the equipment ground.

The circuitry described in my prior filed application, above identified, which includes a battery charger as a component in the circuit, has been found to be particularly effective for the cathodic protection of the metallic fittings of non-metallic hulls of power boats. However, I have now found that the latter advantages may be obtained even though a battery charger is not included as a component in the electrical system.

In order to insure effective protection for both the boat's personnel and electrical equipment, the present circuit has been designed to incorporate a number of safe-guards, namely, circuit breakers in the hot leg and in the neutral leg of the 110–120 volt alternating current shore-based power supply; a polarity alarm and a polarity light socket in which is inserted a Hubbell Polarity Light, described in detail in U.S. Pat. No. 3,383,588, issued to R. F. Stoll et al., on May 14, 1968.

In my prior application it was pointed out that, normally, when boats of the type in question are docked, electrical power is obtained from a shore-based power source rather than from on-board electrical generation equipment.

The circuits customarily employed are usually responsible for excessive corrosion of the metal fittings of the boat which are immersed in sea water because of the galvanic condition existing between the boat and shore-based metal installations.

One of the purposes of this invention is to lessen or eliminate this objectionable electrolysis problem and at the same time to provide adequate safe-guards to insure protection for the personnel and boat equipment when the shore-based power supply at the dock is improperly wired or is defective for any reason.

In this system, all battery grounds, as in my prior system, and the 110–120 volt alternating current shore-based equipment ground and neutral leg are electrically connected and it has been found that this minimizes the electrolysis problem encountered on conventionally wired boats with non-metallic hulls, and in most instances, eliminates the necessity of using sacrificial zincs.

These, and other advantages of my novel circuitry, will be apparent from the following description.

In the accompanying drawing there is shown a diagram of a preferred form of circuitry for power boats having non-metallic hulls, such as wood or fiber glass, and supplied from a shore-based 110–120 volt alternating current supply and including circuit breakers, a polarity alarm and a grounding-type test socket adapted to receive a circuit tester of the type herein described.

The major components of my improved circuit comprise a 110–120 volt alternating current shore-based source of power 1; a conventional shore connection 5; a reverse service boat receptace 6; 30–40 ampere circuit breakers $B_1$ and $B_2$; a single pole spring-loaded switch $S_1$, normally closed; a grounding-type test socket $PL_1$; and a polarity alarm, including a bell $B_3$, and a warning light $L_1$.

In the accompanying drawing, the numeral 1 designates, in general, a shore-based 3-wire 110–120 volt source of alternating current comprising a hot leg 2 (coded black); a neutral leg 3 (coded white); and an equipment ground 4 (coded green).

The numeral 5 identifies a conventional shore connection linked by the customary cable to the boat's electrical circuit through a reverse service boat receptacle 6. This portion of the circuit represents conventional practice as shown in the February 1972 issue of MOTOR BOAT AND SAILING, FIG. 1, at page 82.

The hot leg 2 of the shore-based power supply is connected through the shore connection 5 and the reverse boat receptacle 6 by line 8 to terminal 9 of circuit breaker $B_1$, of 30 or 40 ampere capacity. The other terminal 10 of this circuit breaker is connected by line 11 to the load, indicated generally as $L_2$.

The neutral leg 3 is also connected through shore connection 5 and the reverse boat receptacle 6 by line 13 through junction 14 to terminal 15 of $S_1$, a single pole, normally closed, spring loaded switch of 30 to 40 ampere capacity. The other terminal 16 of this switch is connected through junction 17, by line 18 to terminal 19 of circuit breaker $B_2$, also of 30 or 40 ampere capacity. The ampere capacity of the two circuit breakers is preferably the same. The other terminal 20 of circuit breaker $B_2$ is connected through junction 21 by line 22 to the load, designated generally, by $L_2$. Line 23 is connected at junction 21 to line 22 and to the ground plate 7.

The equipment ground 4 of the shore-based power supply is connected through shore connection 3 and the reverse service receptacle 6, by line 12 to ground plate 7.

PL designates a grounding-type test socket having three contacts 24, 25 and 26, adapted to receive a three-prong circuit tester, such as that described in U.S. Pat. No. 3,383,588, issued to R. F. Stoll et al., on May 14, 1968. The device described in this patent provides a reliable tester adapted for plug-in application in a grounding socket of the type shown and wired in accordance with the circuit described herein. The hot, neutral and grounding conductors of the socket must be correctly wired or connected with the corresponding conductots of the supply line or cable to which it is attached.

The tester described in the patent, identified above, is adapted to distinguishably indicate wiring errors, including the reversed connection of the hot and neutral terminals of the socket, respectively, with the neutral and hot conductors of the supply line; the reversed connection of the hot and grounding terminals of the socket, respectively, with the grounding and hot conductors of the supply line; the connection of the neutral terminal of the socket with the hot conductor of the supply line, and the failure to connect either the hot terminal, the neutral terminal or the grounding terminal of the socket with the corresponding conductor of the supply line.

Line 27 connects line 13 at junction 14, with contact 24 of the grounding-type test socket $P_L$ while line 29 connects contact 25 of said socket with the load, designated generally as $L_2$. Contact 26 of the test socket $P_L$ is connected by line 28 to terminal 9 of the circuit breaker $B_1$, completing the circuitry to the test socket.

The circuitry includes a polarity alarm designated generally, at P and comprises, for audible warning, a bell, $B_3$, and for visible warning, a light, preferably red, $L_1$.

Line 31 connects terminal 30 of terminal strip $T_1$ to line 29 at junction point 32 while line 33 connects line 18 at junction point 17 with terminal 34 of said terminal strip. $R_1$ designates a conventional double socket, the common terminal thereof 35, being connected by line 36 to terminal 30 of terminal strip $T_1$. The other terminals 37 and 38 of the double socket $R_1$ are connected by line 39 and at junction 40 by line 41 to terminal 34 of terminal strip $T_1$.

Terminals 42 and 43 of alarm bell $B_3$ are connected by lines 44 and 45, respectively, to a conventional 2-prong plug 46.

Terminals 47 and 48 of warning light $L_1$ are connected by lines 49 and 50, respectively, to a conventional 2-prong plug 51. In operation, the plugs 46 and 51 are inserted into the upper and lower sockets, respectively, of receptacle $R_1$. While I have illustrated but one form of plug and socket to connect the alarm bell and warning light into the circuit, it is obvious that other types of plugs and sockets may be used. The bell and light, for example, may be directly wired into the circuit and switches may be used if desired.

To complete the circuitry, line 52 connects the ground plate 7 with the battery ground while line 53 connects the ground plate 7 with the ship's bonding ground.

The herein described circuitry affords effective protection for personnel and the boat's electrical equipment. In the event the shore connection is improperly wired, namely, one in which a hot wire is connected to either ground, instantaneously, one or both circuit breakers will kick out, cutting off the current to the ship's equipment but not off the alarm since the latter draws its current from the hot or shore side of the circuit breakers rather than from the load side. The alarms, both audible and visual, will therefore continue to operate until unplugged from the improperly wired shore connection.

The Hubbell Polarity Light will not only indicate reversed polarity but also a broken or disconnected wire in any one of the three wires supplying the boat from a shore-based power source. This tester, as described in the patent, includes three interdistinguishable lamps, designated in the patent as 21 (red); 22 (yellow), and 23 (white), so wired as to selectively glow in response to correct or defective wiring conditions in a circuit including an electrical outlet into which the tester is plugged.

Correct or improper wiring in the circuit may be detected in accordance with the Table appearing at the top of Column 5 of the patent, namely, U.S. Pat. No. 3,383,588. If the wiring of the current supply is correct, the yellow and white lights will light up; if either the ground or neutral wire is open, the white light alone will light up; if the hot and neutral wires are reversed, the red and the yellow lights will light up, while if the hot and ground wires are reversed, the red and the white lights will be activated.

In the event the hot wire of the power source is connected to the neutral terminal, the hot terminal being unwired, only the red light will light up while if the hot wire is open, no light will show.

It will be obvious to those skilled in the art that various modifications may be made in the conventional portion of the described circuit within the scope of the present invention without departing from the spirit thereof, it being essential, however, that the neutral leg of the shore-based alternating current supply by electrically connected with both the ground plate and the bonding ground of the boat.

I therefore particularly point out and distinctly claim as my invention:

1. In a system protecting personnel and electrical equipment of docked power boats having non-metallic hulls and protecting the immersed metal fittings of such hulls from corrosion, said boats being supplied from a shore-based source of 3-wire, customary voltage alternating current comprising a hot leg, a neutral leg and an equipment ground;
   circuit breakers inserted in the hot leg and the neutral leg of the alternating current supply;
   a polarity alarm which will continue to operate when a circuit breaker is in open position;
   a grounding socket adapted to receive a polarity light tester;
   a battery ground;
   a ground plate and a bonding ground, and
   an electrical circuit in which the negative lead of the battery ground, the equipment ground, and the neutral leg of the shore-based alternating current supply are electrically connected with both the ground plate and the bonding ground of the boat.

2. The protective system of claim 1 in which the polarity alarm includes a bell for audible warning and a light for visual warning.

3. The protective system of claim 1 in which the shore-based power source is 110–120 volt, 3-wire alternating current.

* * * * *